(12) United States Patent
Oyama

(10) Patent No.: US 9,146,091 B2
(45) Date of Patent: Sep. 29, 2015

(54) DISPLACEMENT MEASUREMENT APPARATUS AND DISPLACEMENT MEASUREMENT METHOD

(71) Applicant: Taiyo Yuden Co., Ltd., Tokyo (JP)

(72) Inventor: Katsuhiro Oyama, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 7 days.

(21) Appl. No.: 14/036,029

(22) Filed: Sep. 25, 2013

(65) Prior Publication Data

US 2014/0092393 A1  Apr. 3, 2014

(30) Foreign Application Priority Data

Sep. 28, 2012  (JP) ................................. 2012-218462

(51) Int. Cl.
    *G01B 11/02*    (2006.01)
    *G01B 9/02*     (2006.01)
    *G01D 5/38*     (2006.01)

(52) U.S. Cl.
    CPC .............. *G01B 9/02* (2013.01); *G01B 9/0207* (2013.01); *G01D 5/38* (2013.01)

(58) Field of Classification Search
    CPC .. G01B 9/02; G01B 9/02055; G01B 9/02062; G01B 9/02067; G01B 9/0207; G01B 9/02072; G01B 9/02074; G01D 5/347; G01D 5/38
    See application file for complete search history.

(56) References Cited

U.S. PATENT DOCUMENTS

| 4,846,576 A | * | 7/1989 | Maruyama et al. | ........... 356/604 |
| 2002/0109100 A1 | * | 8/2002 | Jackson et al. | ............. 250/458.1 |
| 2012/0250031 A1 | | 10/2012 | Ikeda et al. | |

FOREIGN PATENT DOCUMENTS

| JP | 2014-071037 A | 4/2014 |
| JP | 5502963 B2 | 5/2014 |
| WO | 2011/043354 A1 | 4/2011 |

OTHER PUBLICATIONS

Office Action dated Dec. 24, 2014 in Japanese Application No. 2014-048554.

* cited by examiner

*Primary Examiner* — Michael A Lyons
(74) *Attorney, Agent, or Firm* — Saliwanchik, Lloyd & Eisenschenk

(57) ABSTRACT

There is provided a displacement measurement apparatus including: a light source; a pair of diffraction gratings that light emitted from the light source enters, the pair of diffraction gratings opposing each other while being relatively movable along an optical axis; a first optical sensor that detects interference light obtained by diffracted light emitted from a diffraction grating device of each of the pair of diffraction gratings; a second optical sensor that detects non-interference light emitted from the pair of diffraction gratings; and a correction unit that corrects a signal obtained by the first optical sensor based on a signal obtained by the second optical sensor.

5 Claims, 14 Drawing Sheets

| | 3.3 μm pitch this time (optical intensity) | | |
|---|---|---|---|
| Groove depth | 0-order | 1-order | 0-/1-order |
| 472nm End | 1.2 | 1.52 | 0.79 |
| 473nm Center | 1.28 | 1.48 | 0.85 |
| 529nm | 0.8 | 1.72 | 0.46 |
| 543nm | 0.64 | 2.1 | 0.31 |
| 695nm | 0.04 | 2.32 | 0.018 |
| 795nm | 0.08 | 2.1 | 0.04 |

FIG.9

DISPLACEMENT MEASUREMENT APPARATUS AND DISPLACEMENT MEASUREMENT METHOD

CROSS-REFERENCE TO RELATED APPLICATION

This application claims priority under 35 U.S.C. §119 to Japanese Patent Application No. JP 2012-218462 filed on Sep. 28, 2012, the entire content of which is hereby incorporated herein by reference in its entirety.

FIELD

The present disclosure relates to a displacement measurement apparatus and a displacement measurement method that use an optical interference.

BACKGROUND

For example, International Publication No. WO2011/043354 discloses a displacement measurement apparatus that uses an optical interference. The displacement measurement apparatus includes, in the stated order from a light source side, a laser light source, a collimator lens, a first diffraction grating, a second diffraction grating, and an optical sensor. The optical sensor detects diffracted light (e.g., 1-order) diffracted by the first diffraction grating and interference light with respect to diffracted light (e.g., 1-order) that is caused as 0-order light that has passed directly through the first diffraction grating is diffracted by the second diffraction grating. The displacement measurement apparatus measures a distance between the first diffraction grating and the second diffraction grating, that is, a displacement of a measurement target, based on a change in a light amount due to brightness/darkness of the interference light detected by the optical sensor (see, for example, paragraphs [0020], [0023], and [0027] and FIG. 1 to 3 of International Publication No. WO2011/043354).

SUMMARY

In general, in a displacement measurement apparatus that uses an optical interference, an output of emission light from a light source may fluctuate due to an age-related deterioration of the apparatus, a temperature change in a usage environment, and the like, and thus there is a fear that an error may be caused in the output as a detection value obtained by the optical sensor. In such a case, a displacement cannot be measured accurately since it is difficult to determine whether the output fluctuation of the optical sensor is due to a displacement between diffraction gratings or whether it is due to the defect as described above.

In view of the circumstances as described above, it is desirable to provide a displacement measurement apparatus capable of accurately measuring a displacement and a displacement measurement method used in the displacement measurement apparatus.

According to an embodiment of the present disclosure, there is provided a displacement measurement apparatus including a light source, a pair of diffraction gratings, a first optical sensor, a second optical sensor, and a correction means.

Light emitted from the light source enters the pair of diffraction gratings that are provided opposed to each other while being relatively movable along an optical axis.

The first optical sensor detects interference light obtained by diffracted light emitted from a diffraction grating device of each of the pair of diffraction gratings.

The second optical sensor detects non-interference light emitted from the pair of diffraction gratings.

The correction means corrects a signal obtained by the first optical sensor based on a signal obtained by the second optical sensor.

According to an embodiment of the present disclosure, there is provided a displacement measurement method including emitting light from a light source.

Detected by a first optical sensor is interference light obtained by diffracted light emitted from a diffraction grating device of each of a pair of diffraction gratings provided opposed to each other while being relatively movable along an optical axis.

Detected by a second optical sensor out of the light emitted from the light source is non-interference light.

A signal obtained by the first optical sensor is corrected based on a signal obtained by the second optical sensor.

BRIEF DESCRIPTION OF THE DRAWINGS

FIG. 9 is a table showing a result of comparing 0-order light and 1-order light for several samples including a diffraction grating having a groove depth of 473 μm out of the measurement samples shown in FIG. 7;

DETAILED DESCRIPTION OF EMBODIMENTS

According to an embodiment of the present disclosure, there is provided a displacement measurement apparatus including: a light source; a pair of diffraction gratings that light emitted from the light source enters, the pair of diffraction gratings opposing each other while being relatively movable along an optical axis; a first optical sensor that detects interference light obtained by diffracted light emitted from a diffraction grating device of each of the pair of diffraction gratings; a second optical sensor that detects non-interference light emitted from the pair of diffraction gratings; and a correction means for correcting a signal obtained by the first optical sensor based on a signal obtained by the second optical sensor.

According to this embodiment, by providing the second optical sensor that detects non-interference light, the signal obtained by the first optical sensor is corrected using the signal obtained by the second optical sensor. As a result, even when an output of the light source fluctuates, a displacement can be measured accurately.

The second optical sensor may detect 0-order light that passes through the pair of diffraction gratings. Since the second optical sensor only needs to detect the 0-order light that passes the pair of diffraction gratings, an arrangement design of the second optical sensor becomes easy.

The diffraction grating device of one of the pair of diffraction gratings may include a diffraction grating area and a non-diffraction grating area, and the second optical sensor may detect light that passes through the non-diffraction grating area as the non-interference light.

The correction means may perform the correction based on an expression that expresses a relationship between an intensity of the interference light obtained by the first optical sensor and an intensity of the non-interference light obtained by the second optical sensor. With this structure, the output fluctuation of the light source can be obtained by an operation.

Hereinafter, embodiments of the present disclosure will be described with reference to the drawings.
(Basic Structure of Displacement Measurement Apparatus)

Figure 1:
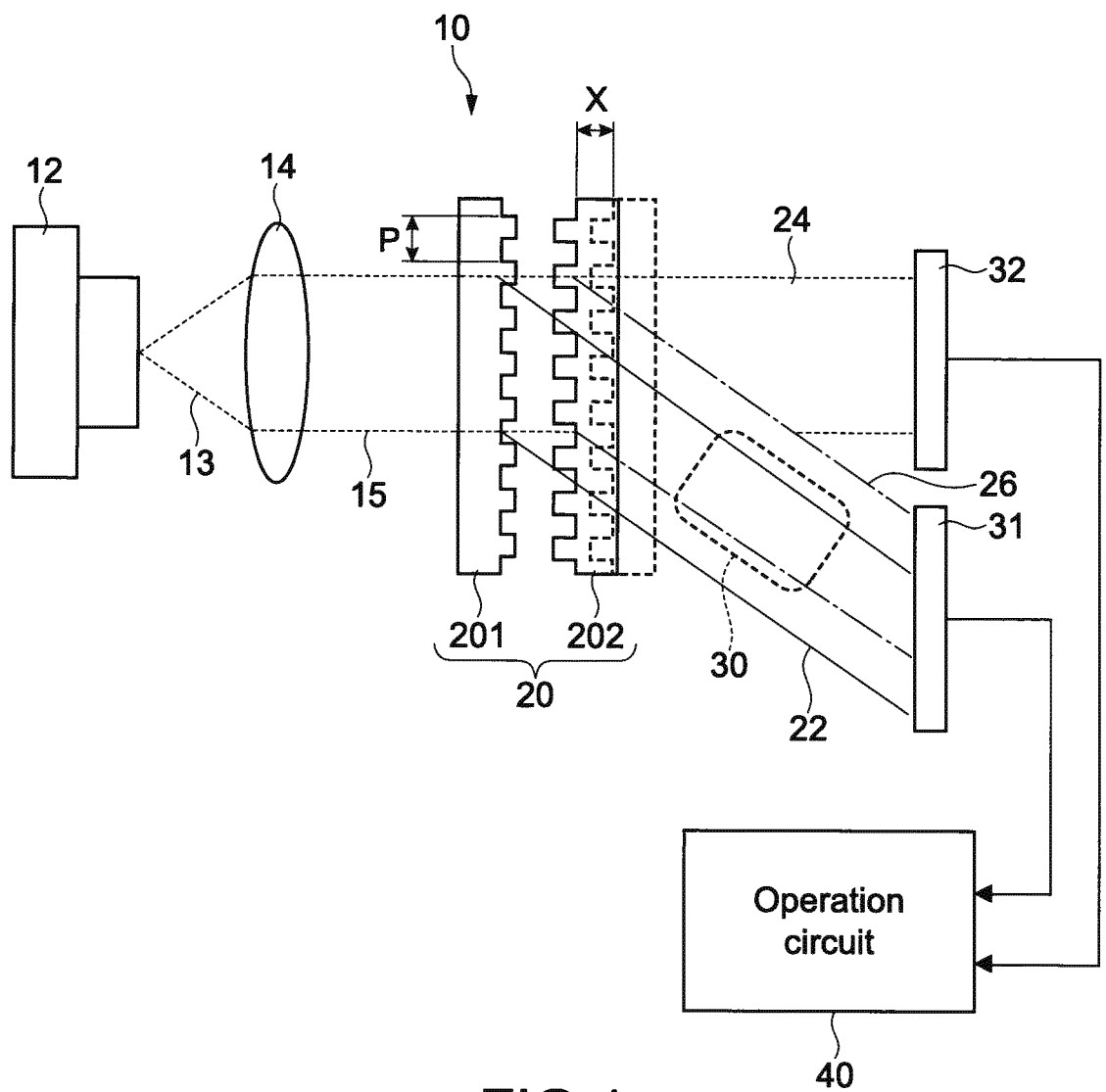
FIG. 1 is a diagram schematically showing a basic structure of an optical system of a displacement measurement apparatus according to an embodiment of the present disclosure.

FIG. 1 is a diagram schematically showing a basic structure of an optical system of a displacement measurement apparatus according to an embodiment of the present disclosure.

A displacement measurement apparatus 10 includes an LD (Laser Diode) 12, a collimator lens 14, a pair of diffraction gratings 20, a first PD (Photo Detector) 31, and a second PD 32.

The LD 12 is a light source that emits laser light and is driven by a driver (not shown).

The collimator lens 14 changes light 13 emitted from the LD 12 to parallel light 15.

Light from the LD 12 enters the pair of diffraction gratings 20, and the pair of diffraction gratings 20 emit diffracted light. The pair of diffraction gratings 20 is constituted of a first diffraction grating (diffraction grating device) 201 and a second diffraction grating (diffraction grating device) 202. The first diffraction grating 201 and the second diffraction grating 202 are provided opposed to each other while being relatively movable along an optical axis. The first diffraction grating 201 splits the incident parallel light 15 into straight light 24 and diffracted light 22. The second diffraction grating 202 additionally splits the straight light 24 into straight light 24 and diffracted light 26.

In actuality, the parallel light 15 that has passed the first diffraction grating 201 is split into 0-order light that travels in the same direction as the parallel light 15, that is, 0-order diffracted light and ±n-order light having a diffraction angle with respect to the 0-order light, that is, ±n-order diffracted light (n is a natural number of 1 or more).

Here, for convenience, 0-order light that travels in the same direction as the parallel light 15 after passing through the first diffraction grating 201 and the second diffraction grating 202 is referred to as straight light 24. Further, +1-order light that is obtained by the first diffraction grating 201 and travels in the same direction even after passing through the second diffraction grating 202 is referred to as diffracted light 22. Furthermore, +1-order light that has passed through the second diffraction grating 202 out of the 0-order light that has passed through the first diffraction grating 201, that is, the straight light 24 is referred to as diffracted light 26.

It should be noted that although +1-order light is used in this embodiment, the following displacement measurement may also be performed using diffracted light of different predetermined orders. Moreover, although there are a large number of diffracted light rays in addition to those shown in FIG. 1 in actuality, illustrations thereof are omitted. The same holds true for other embodiments to be described later.

Figure 2:
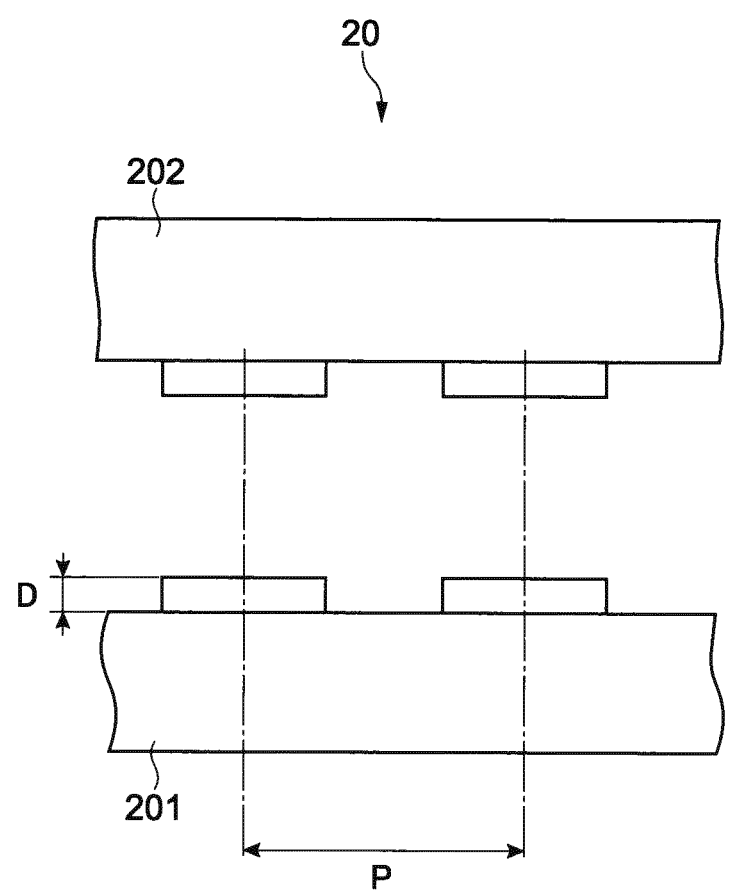
FIG. 2 is a diagram showing a structural example of a pair of diffraction gratings.

FIG. 2 is a diagram showing a structural example of the pair of diffraction gratings 20. The first diffraction grating 201 and the second diffraction grating 202 have substantially the same shape and size. In the first diffraction grating 201 and the second diffraction grating 202, a groove pitch is 3.3 μm and a groove depth is 473 μm, for example, though the values are not limited thereto.

A movement amount of the second diffraction grating 202 with respect to the first diffraction grating 201 is a displacement X (see FIG. 1) as a measurement target. A path (optical path) difference of each of the diffracted light 22 and 26 is caused in accordance with a relative movement of the first diffraction grating 201 and the second diffraction grating 202. Therefore, an interference pattern is generated by interference light 30 caused by the diffracted light 22 obtained by the first diffraction grating 201 and the diffracted light 26 obtained by the second diffraction grating 202. The first PD 31 as an optical sensor detects a change in a light amount of the interference pattern. The light amount change of the interference pattern shows a sine curve in principle and corresponds to the displacement X as the measurement target. More specifically, by detecting a roughly linear area corresponding to a half wavelength out of the light amount change in the sine curve of the interference pattern by the first PD 31, the displacement X corresponding to the linear area is measured.

Connected to the first PD 31 is an operation circuit 40. The first PD 31 outputs, as an output signal to the operation circuit 40, a current corresponding to the light amount change caused by the interference pattern of the interference light 30. The operation circuit 40 converts the current output from the first PD 31 in accordance with the light amount change into a voltage and AD-converts the voltage. Then, the operation circuit 40 corrects the AD-converted signal based on a signal obtained by the second PD 32 as will be described later and outputs the value of the displacement X.

The second PD 32 detects a light amount of non-interference light that is not interference light out of the light emitted from the pair of diffraction gratings 20. In this embodiment, the second PD 32 detects, as the non-interference light, 0-order light that has passed through the first diffraction grating 201 and the second diffraction grating 202, that is, the straight light 24. The light amount of the non-interference light indicates fluctuation characteristics corresponding to an output fluctuation of the LD 12 (i.e., fluctuation of power of emission light from LD 12). As described above, since the interference light 30 fluctuates according to the displacement X, the first PD 31 cannot detect the output fluctuation of the LD 12 and the like. In this regard, in this embodiment, the second PD 32 is provided to detect the non-interference light that does not depend on the displacement X (straight light 24 herein), with the result that the output fluctuation of the LD 12 can be detected.

The operation circuit 40 is also connected to the second PD 32 so that the current signal obtained by the second PD 32 is input to the operation circuit 40. The operation circuit 40 converts the input current into a voltage and AD-converts the voltage.

The operation circuit 40 mainly includes hardware such as an MPU (Micro Processing Unit), a RAM (Random Access Memory), and a ROM (Read Only Memory). The operation circuit 40 may include a PLD (Programmable Logic Device) such as an FPGA (Field Programmable Gate Array), a DSP (Digital Signal Processor), an ASIC (Application Specific Integrated Circuit), or the like in addition to or in place of the MPU. Moreover, the operation circuit 40 may be structured by a plurality of physically-separate chip packages, devices, and the like.

(Correction Means (1))

Descriptions will be given on an example where, as means for accurately measuring a displacement, a signal obtained by the first PD 31 is corrected even when the output of the LD 12 fluctuates in the displacement measurement apparatus 10 structured as described above, for example. As will be described hereinafter, the operation circuit 40 functions as a correction means for correcting a signal obtained by the first PD 31 based on a signal obtained by the second PD 32.

Figure 3:
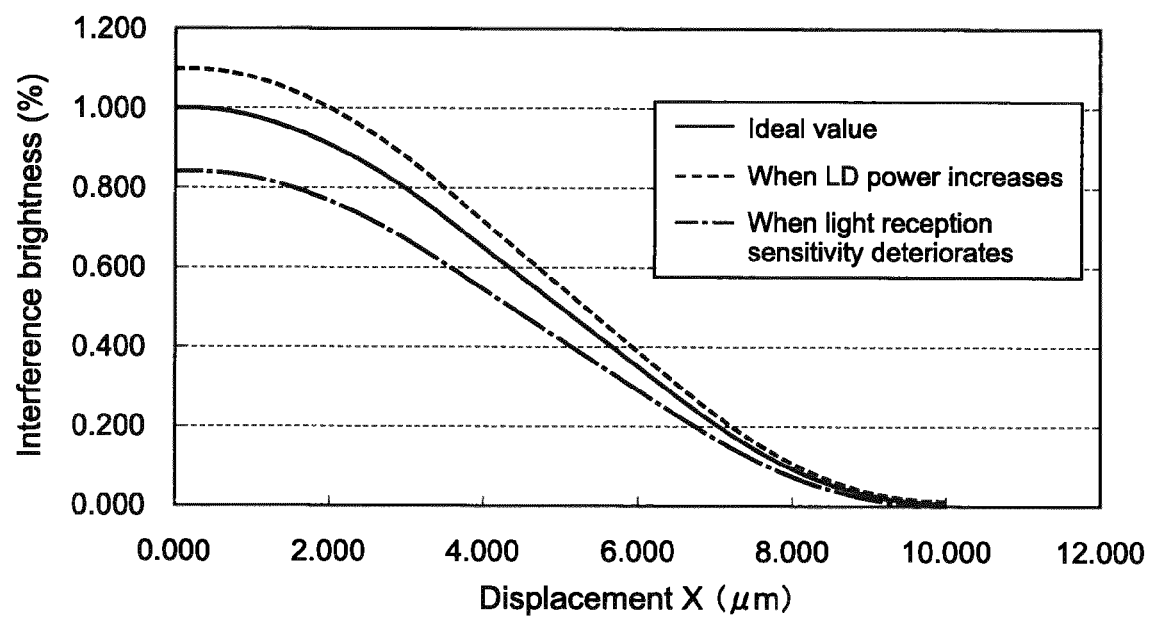
FIG. 3 is a graph showing a simulation result of a relationship between a displacement as a distance between the pair of diffraction gratings and interferency brightness of interference light.

FIG. 3 is a graph showing a simulation result of a relationship between a distance between the diffraction gratings 201 and 202 (i.e., displacement X described above) and interferency brightness (normalized) of the interference light 30. The interferency brightness (brightness of interference light) of the interference light 30 practically corresponds to the light amount of the interference light 30 detected by the first PD 31, and the interferency brightness for a half wavelength of the sine curve described above corresponds to the graph. It should be noted that the curve in a solid line indicates ideal values out of the three curves shown in the graph. The curve as the ideal values is normalized with the interferency brightness at a time the displacement X is 0 μm being 1% and the interferency brightness at a time the displacement X is 10 μm being 0%.

As shown in the example in the graph, the curve of the interferency brightness increases when the output of the emission light from the LD 12 increases, and thus the displacement cannot be measured accurately. In addition, also when a light reception sensitivity of the first PD 31 deteriorates, the curve of the interferency brightness decreases, and thus the displacement cannot be measured accurately.

In this regard, in this embodiment, by correcting the light reception sensitivity characteristics of the first PD 31 by the operation circuit 40, it is possible to bring the interferency brightness closer to the ideal value. Specifically, the correction is performed as follows.

Figure 4A:
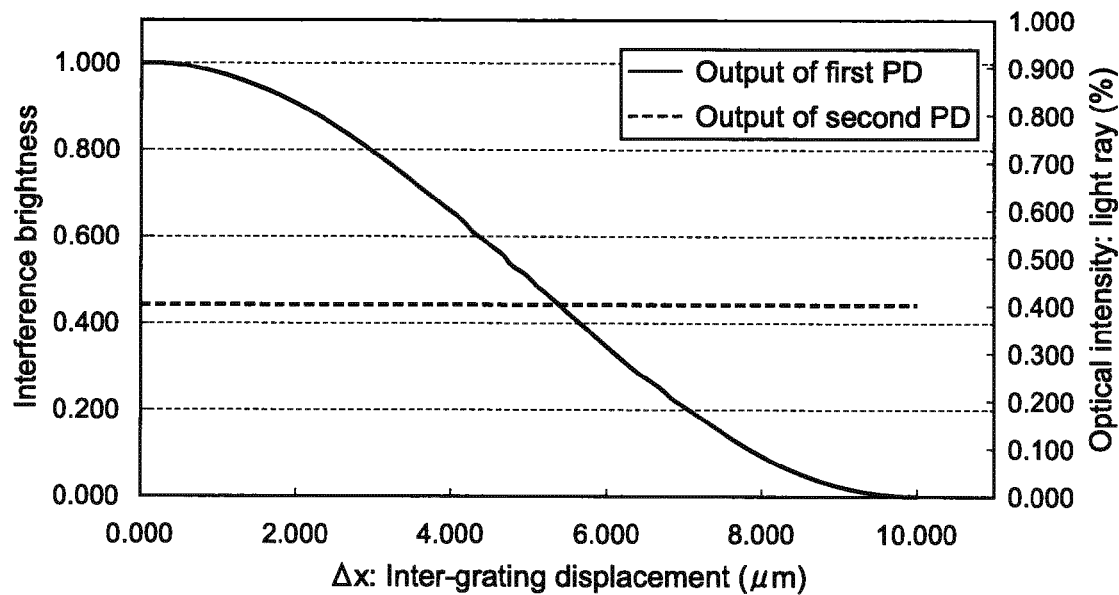
FIGS. 4A and 4B are graphs each showing a simulation result of a correlation of outputs of first and second PDs (Photo Detectors)
Figure 4B:
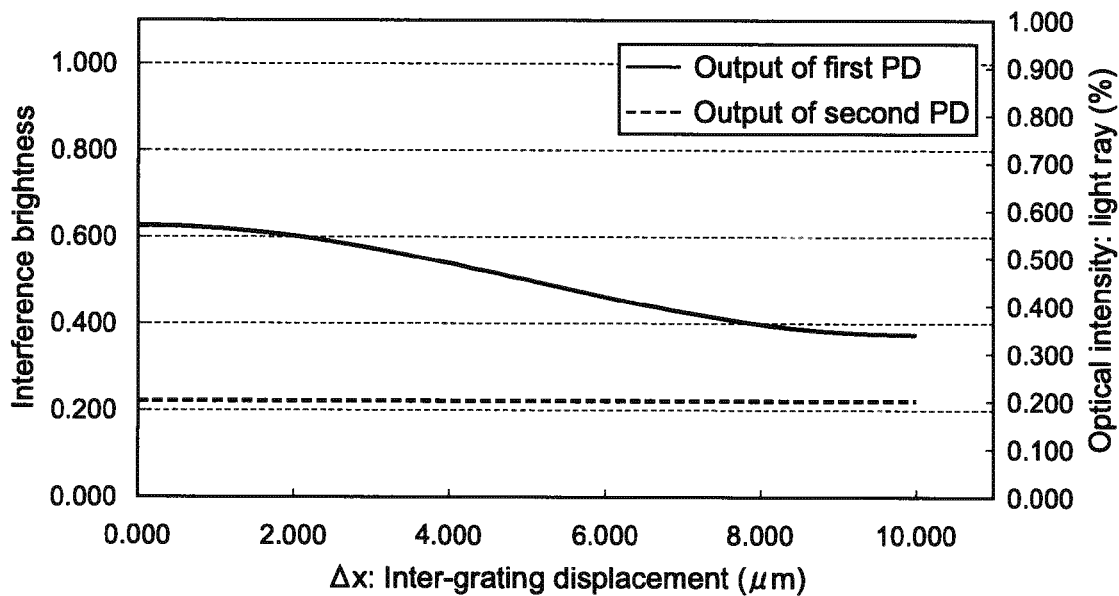

FIGS. 4A and 4B are graphs each showing a simulation result of a correlation of outputs of the first PD 31 and the second PD 32. In the graphs, the output by the first PD 31 corresponds to the interferency brightness on the ordinate axis shown on the left-hand side, and the output by the second PD 32 corresponds to the optical intensity on the ordinate axis shown on the right-hand side. The abscissa axis represents the displacement X. The values on the ordinate axes on both sides and the values on the abscissa axis are normalized.

As shown in FIG. 4A, when the output of the first PD 31 shows an ideal value, the output of the second PD 32 shows almost 0.4%. On the other hand, as shown in FIG. 4B, when the output of the second PD 32 is lowered as compared to the case shown in FIG. 4A, an output width (dynamic range) of the first PD 31 is narrowed along with that. For example, when the detection value of the non-interference light (detection value of second PD 32) becomes ½ in FIG. 4A, the detection value of the interference light (detection value of first PD 31) is lowered to 62.5% as shown in FIG. 4B. In this case, even when the distance between the diffraction gratings is 0, it is erroneously detected that the distance between the diffraction gratings is 4 μm.

It should be noted that the interferency brightness at the right end of the output of the first PD 31 in FIG. 4B is not 0. On the contrary, the interferency brightness at the right end of the graph shown in FIG. 3 is 0. The difference between the graphs is due to a difference between input parameters in the simulation, and the setting of FIG. 4B is closer to reality than that of FIG. 3.

Comparing FIGS. 4A and 4B, when the output of the second PD 32 becomes ½, the output width of the first PD 31 expressed by the interferency brightness becomes ¼. In principle, the correlations of the outputs of the first PD 31 and the second PD 32 shown in FIGS. 4A and 4B are determined by the following well-known Expression 1.

$$I = |E_1 + E_2|^2 = E_{01}^2 + E_{02}^2 + 2E_{01}E_{02} \cos\{(k_1 - k_2)r + \phi_1 - \phi_2\} \quad \text{Expression 1}$$

I: Intensity of interference light 30

$E_1 + E_2$: Intensity (amplitude) of interference light that has passed through pair of diffraction gratings 20 (diffracted light 22 and 26)

$E_1$ and $E_2$ represent amplitudes of the diffracted light 22 and 26 emitted from the pair of diffraction gratings 20. I represents an intensity of the emission light of the pair of diffraction gratings 20 (interference light 30). $E_1 + E_2$ represents an amplitude of interference light between the diffracted light 26 having an amplitude $E_1$ (0-order light obtained by first diffraction grating 201 and 1-order light obtained by second diffraction grating 202) and the diffracted light 22 having an amplitude $E_2$ (1-order light obtained by first diffraction grating 201 and 0-order light obtained by second diffraction grating 202).

Figure 7:
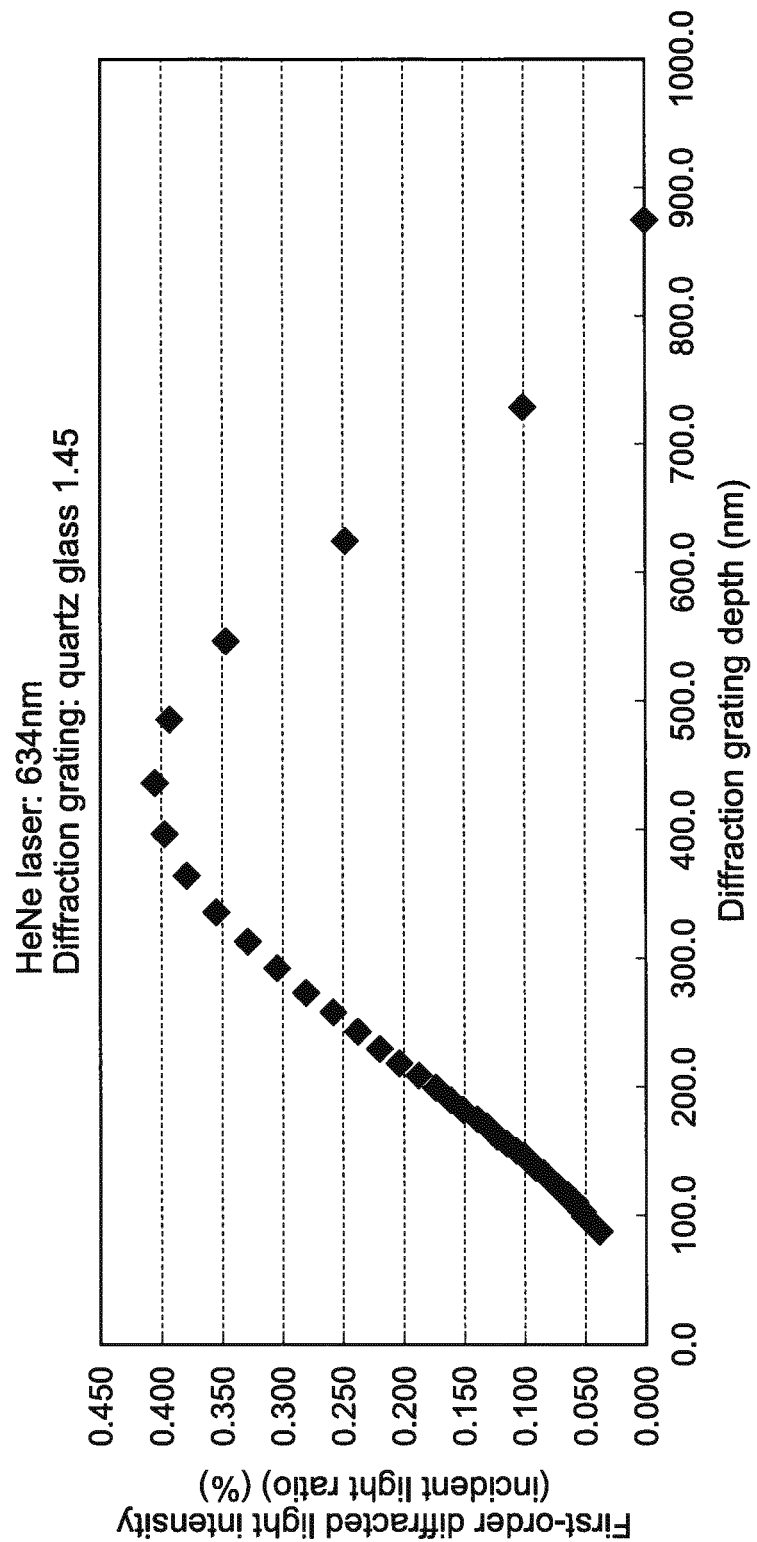
FIG. 7 is an actual measurement graph of diffraction gratings having grooves of different depths, the graph showing a relationship between the depth and an intensity of 1-order diffracted light.

Further, when a diffraction grating having a groove with a depth of 423 μm shown in FIG. 7 is used, for example, the amplitude of the 0-order light and the amplitude of the 1-order light become substantially the same. Therefore, since the amplitudes of the diffracted light 22 and 26 are substantially the same as the amplitude of the straight light 24, by detecting the straight light 24 by the second PD 32, an error between the amplitudes of the diffracted light 22 and 26 can be determined.

In this embodiment, the signal obtained by the first PD 31 is corrected using Expression 1 above. It should be noted that a derivation method of Expression 1 will be described later. As the correction method, there is a method as follows.

A memory of the operation circuit 40 stores in advance a reference value of the output value of the second PD 32. For example, the output curve of the second PD 32 shown in FIG. 4A becomes a set of reference values. The memory of the operation circuit 40 also stores Expression 1 above as an operation algorithm. As a result, the operation circuit 40 can estimate an output fluctuation of the first PD 31 (i.e., output value obtained after fluctuation) using Expression 1 in accordance with the output fluctuation of the second PD 32.

For example, when the output of the second PD 32 becomes ¼ the reference value as shown in FIG. 4B, it can be estimated that the output width of the first PD 31 has become ½. Therefore, in this case, the operation circuit 40 doubles the output value of the first PD 31 so that the original appropriate light reception sensitivity characteristics of the first PD 31 can eventually be obtained.

After the correction, for example, the operation circuit 40 only needs to store a coefficient of the output value of the first PD 31 in the memory and use the coefficient every time the displacement is measured. In this case, the coefficient may be set to 1 as an initial setting.

A correction start timing may be a timing at which a user of the displacement measurement apparatus inputs a predetermined operation to the displacement measurement apparatus, or the operation circuit 40 may start the correction based on a predetermined algorithm.

The following example is an example of a case where the operation circuit 40 starts the correction based on a predetermined algorithm. For example, the operation circuit 40 stores, in addition to the reference value of the output of the second PD 32, a predetermined threshold value for the output of the second PD 32, that is different from the reference value. As the threshold value, a value exceeding the reference value and a value that falls below the reference value may both be set so as to sandwich the reference value, or one of those values may be set. The operation circuit 40 only needs to start the correction when the actual output value of the second PD 32 exceeds (or falls below) the threshold value.

Figure 5:
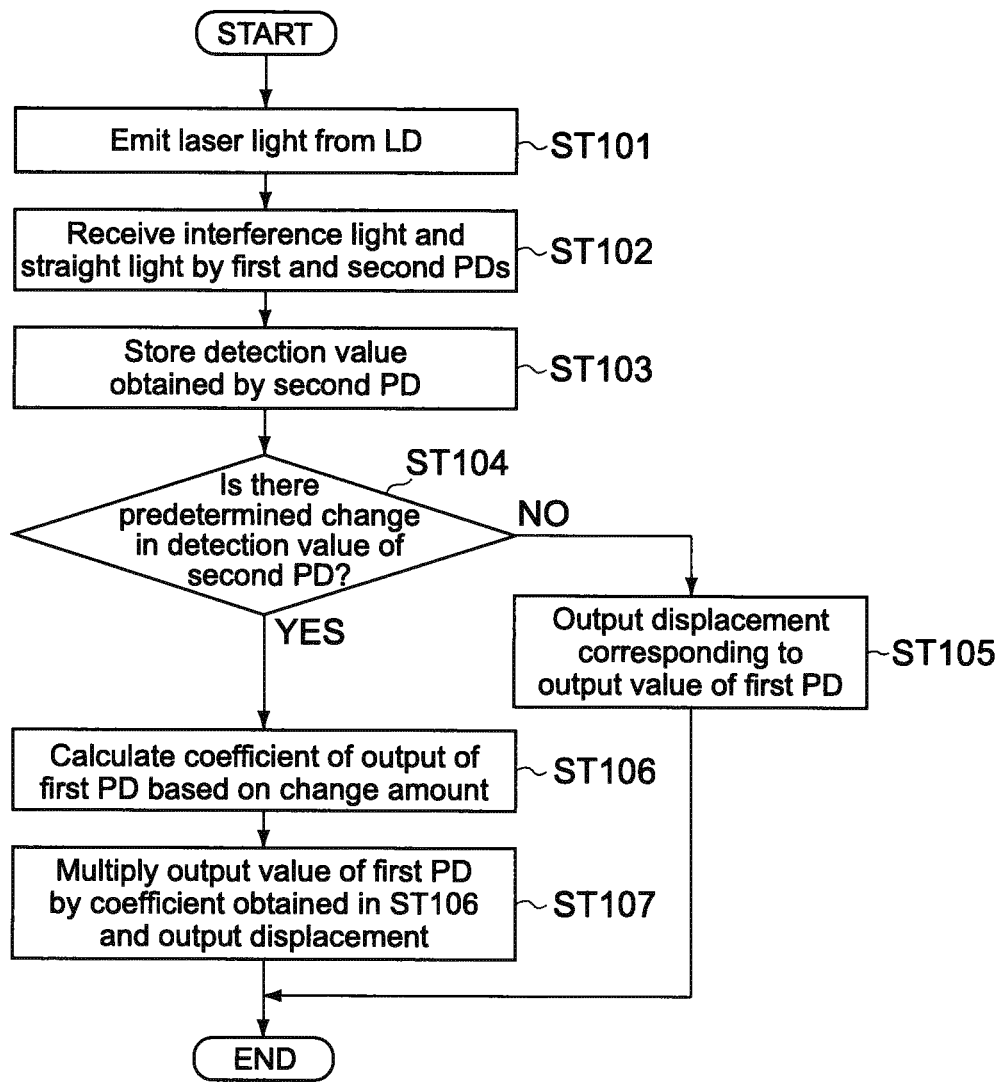
FIG. 5 is a flowchart showing an operation of the displacement measurement apparatus.

The operation of the displacement measurement apparatus 10 as described above, mainly the correction processing, will be described with reference to the flowchart shown in FIG. 5.

Upon start of the displacement measurement, laser light is emitted from the LD 12 (Step 101), and the first PD 31 and the second PD 32 receive the interference light 30 and the straight light 24, respectively (Step 102). The operation circuit 40 stores a detection value output from the second PD 32 in the memory (Step 103). In this case, the operation circuit 40 only needs to store the detection value at a predetermined time interval.

The operation circuit 40 monitors a predetermined change of the detection value output from the second PD 32 with respect to the reference value (Step 104). Here, a percentage value of the detection value of the second PD 32 is monitored with the reference value of the detection value of the second PD 32 being 100%. A case where there is a predetermined change is a case where the threshold value is set as described above and the percentage value exceeds or falls below the threshold value, for example.

When there is no predetermined change in Step 104, it is presumed that the output of the first PD 31 is normal. Therefore, the operation circuit 40 outputs a displacement corresponding to the output value of the first PD 31 (Step 105). As described above, the operation circuit 40 can output a displacement by multiplying the coefficient 1 by the detection value of the first PD 31.

On the other hand, when there is a predetermined change in the detection value output from the second PD 32 in Step 104, the operation circuit 40 calculates a coefficient of the output of the first PD 31 based on the change amount (herein, based on percentage value of second PD 32 as value obtained after change) (Step 106). According to Expression 1, the operation circuit 40 can output a value obtained by raising the percentage value to the second power as the coefficient. Then, the operation circuit 40 multiplies the output value of the first PD 31 by the calculated coefficient and outputs a displacement corresponding to the value obtained by the multiplication (Step 107).

As described above, since the second PD 32 that detects non-interference light is provided in this embodiment, the operation circuit 40 can correct the signal obtained by the first PD 31 using the signal obtained by the second PD 32. Therefore, it becomes possible to accurately measure the displacement even when the output of the LD 12 fluctuates.

In this embodiment, the 0-order light that passes the pair of diffraction gratings 20, that is, the straight light 24 only needs to be detected by the second PD 32. Therefore, as in the optical system shown in FIG. 1, the second PD 32 only needs to be arranged on the optical axis of the LD 12 and the pair of diffraction gratings 20, with the result that the arrangement design of the second PD 32 becomes easy.

(Correction Means (2))

Figure 6:
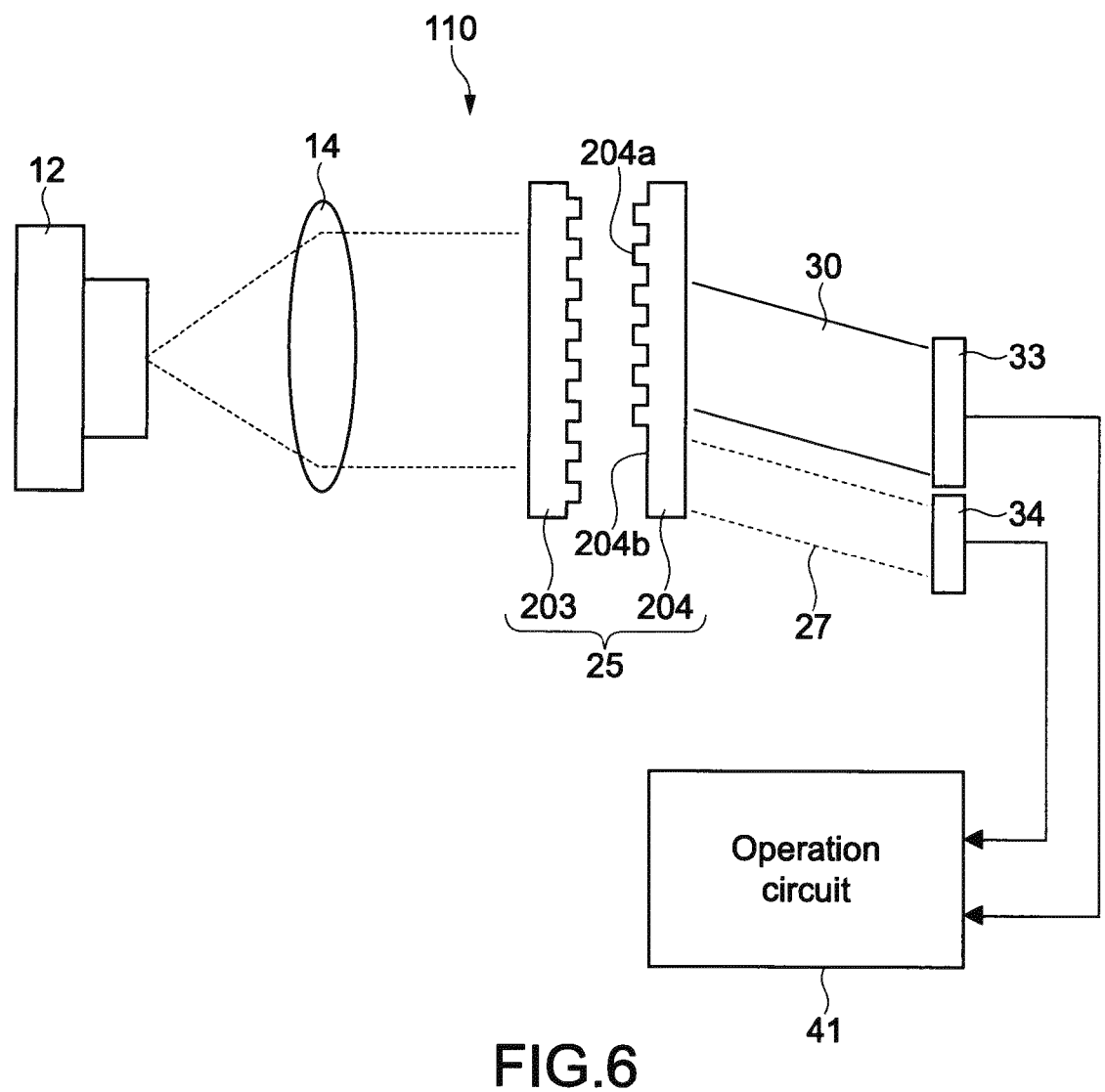
FIG. 6 is a diagram showing an optical system different from that shown in FIG. 1, the optical system being provided for correcting a signal of the first PD.

Next, as means for accurately measuring a displacement even when the output of the LD 12 fluctuates, an example of correcting a signal of a first PD using an optical system different from the optical system described in the correction means (1) above will be described. FIG. 6 is a diagram showing the optical system.

It should be noted that in the descriptions below, descriptions on devices, functions, and the like that are the same as those of the optical system according to the embodiment above shown in FIG. 1 are simplified or omitted, and different points will mainly be described.

A pair of diffraction gratings 25 of a displacement measurement apparatus 110 of this embodiment is constituted of a first diffraction grating device 203 and a second diffraction grating device 204. The first diffraction grating device 203 may be the same as the first diffraction grating 201, for example. One of the first diffraction grating device 203 and the second diffraction grating device 204 (herein, latter second diffraction grating device 204) includes a diffraction grating area 204a and a non-diffraction grating area 204b. The non-diffraction grating area 204b is shaped as a flat plate and is an area with no grooves.

A first PD 33 detects interference light 30 emitted from the pair of diffraction gratings 25. The interference light 30 is interference light of diffracted light that has been diffracted by the first diffraction grating device 203 and that has traveled straight through the diffraction grating area 204a of the second diffraction grating device 204 (e.g., 1-order light) and diffracted light that has traveled straight through the first diffraction grating device 203 and that has been diffracted by the diffraction grating area 204a (e.g., 1-order light).

A second PD 34 detects diffracted light excluding 0-order light, that has been emitted from one of the first diffraction grating device 203 and second diffraction grating device 204 of the pair of diffraction gratings 25, which is, herein, diffracted light 27 that has been diffracted by the first diffraction grating device 203 and that has traveled straight through the non-diffraction grating area 204b of the second diffraction grating device 204. The diffracted light 27 is non-interference light.

As in the embodiment shown in FIG. 1, an operation circuit 41 (not shown) is connected to the first PD 33 and the second PD 34. The operation circuit 41 outputs a displacement by correcting a signal of the first PD 33 based on an output of the second PD 34. Light detected by the second PD 34 is non-interference light and does not depend on a distance between the pair of diffraction gratings 25. Therefore, the operation circuit 41 can use the output of the second PD 34 for correcting the signal of the first PD 33. The correction method by the correction means (2) in this embodiment is the same as that of the correction means (1).

In this embodiment, light reception sensitivity characteristics of the first PD 33 can be corrected also by detecting, by the second PD 34, diffracted light that is not 0-order light as the non-interference light. Therefore, the displacement can be measured accurately.

(Derivation Method of Expression 1)

Hereinafter, the derivation method of Expression 1 above will be described.

A general wave function, which is a wave function of a harmonic wave E herein, is expressed by Expression 2 as follows.

$$E(r,t)=E_0 \sin[\omega t-(kr+\phi)] \quad \text{Expression 2}$$

r: Wave propagation direction
t: Time
$E_0$: Amplitude
$\omega$: Frequency
k: Wave number (k=$\omega$/c, c: phase velocity)
$\phi$: Initial phase In Expression 2, when a spatial portion "−(kr+$\phi$)" of the phase is expressed by $\alpha$ as in Expression 3, Expression 2 can be expressed by Expression 4.

$$\alpha(r,\phi)=-(kr+\phi) \quad \text{Expression 3}$$

$$E(r,t)=E_0 \sin[\omega t+\alpha(r,\phi)] \quad \text{Expression 4}$$

It is assumed that there are two waves that coexist in space at the same frequency and velocity and are expressed by Expressions 5 and 6.

$$E_1=E_{01} \sin(\omega t+\alpha_1) \quad \text{Expression 5}$$

$$E_2=E_{02} \sin(\omega t+\alpha_2) \quad \text{Expression 6}$$

The harmonic wave E that exists accordingly is expressed by Expression 7 below as a superposition of the line shapes of the waves.

$$E = E_1 + E_2 \quad \text{Expression 7}$$
$$= E_{01}(\sin\omega t\cos\alpha_1 + \cos\omega t\sin\alpha_1) +$$
$$(\sin\omega t\cos\alpha_2 + \cos\omega t\sin\alpha_2)$$

Separating the time dependent terms in Expression 7, Expression 7 is expressed by Expression 8.

$$E=(E_{01}\cos\alpha_1+E_{02}\cos\alpha_2)\sin\omega t+(E_{01}\sin\alpha_1+E_{02}\sin\alpha_2)\cos\omega t \quad \text{Expression 8}$$

Since the parenthesis part is a constant value with respect to time in Expression 8, Expression 8 is expressed by Expressions 9 and 10 as follows.

$$E_0 \cos\alpha=E_{01}\cos\alpha_1+E_{02}\cos\alpha_2 \quad \text{Expression 9}$$

$$E_0 \sin\alpha=E_{01}\sin\alpha_1+E_{02}\sin\alpha_2 \quad \text{Expression 10}$$

Since $\sin^2\alpha+\cos^2\alpha=1$ is established, the following Expression 11 is derived from a square sum of Expressions 9 and 10. Therefore, Expression 1 is derived from Expressions 3 and 11.

$$E_0^2=E_{01}^2E_{02}^2+2E_{01}E_{02}\cos(\alpha_2-\alpha_1) \quad \text{Expression 11}$$

(Evaluation of Diffraction Grating)

Next, an evaluation of the diffraction gratings used in the displacement measurement apparatuses of the embodiments above will be described.

Figure 8:
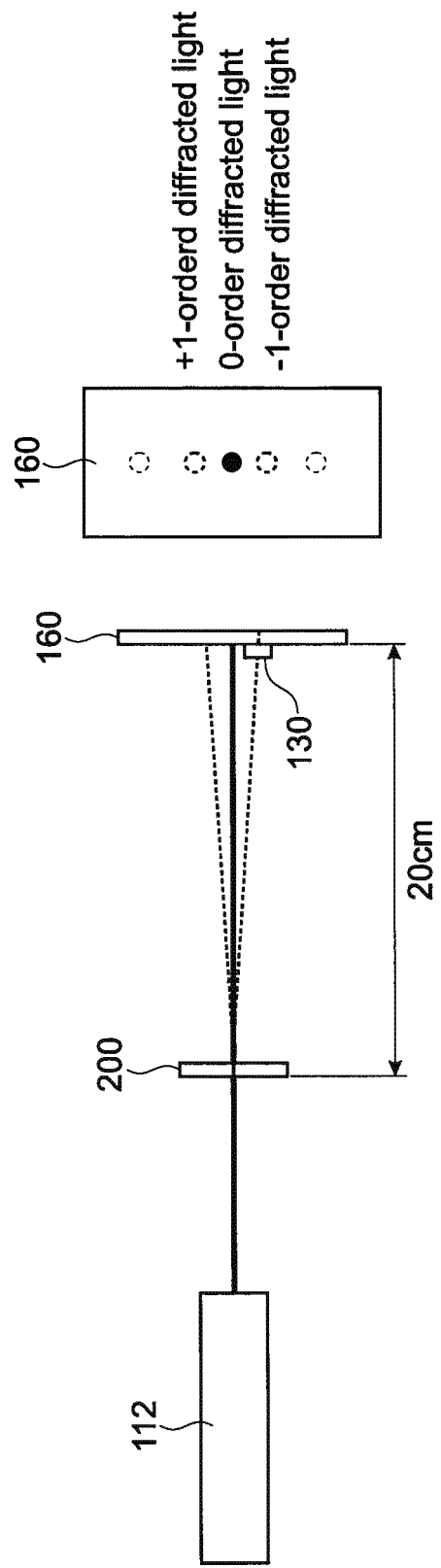
FIG. 8 is a diagram showing a hardware structure used for evaluating the diffraction gratings regarding FIG. 7, and conditions therefor.

FIG. 7 is an actual measurement graph of diffraction gratings having grooves of different depths, the graph showing a relationship between the depths and an intensity of 1-order diffracted light (ratio with respect to incident light of diffraction grating). Groove pitches of the diffraction gratings were all the same (3.3 μm). As a material of the diffraction gratings, quartz glass having a refractive index of 1.45 was used. FIG. 8 is a diagram showing a hardware structure used for evaluating the diffraction gratings and conditions therefor.

As shown in FIG. 8, the inventors of the present disclosure used a HeNe laser (center wavelength 633 nm) as a light source 112 to cause laser light to enter a diffraction grating 200 as an evaluation target and measure an intensity of 1-order diffracted light out of diffracted light irradiated onto a screen 160 using a PD 130. A distance between the diffraction grating 200 and the screen 160 is 20 cm.

It can be seen from the result shown in FIG. 7 that the diffraction grating having a groove depth of 473 μm emits 1-order diffracted light with a highest efficiency.

FIG. 9 is a table showing a result of comparing intensity ratios of 0-order light and 1-order light for several samples including the diffraction grating having a groove depth of 473 μm out of the measurement samples shown in FIG. 7. The groove depth of 472 μm is a depth at an end of a groove, and the groove depth of 473 μm is a depth at a center of a groove.

Of the groove depths of the diffraction gratings having a groove pitch of 3.3 μm, the groove depth with which the ratio of 0-order light and 1-order light comes closest to 1 was 473 μm (groove depth at center). Since a value close to 1 can be obtained as the ratio of 0-order light and 1-order light, 1-order light and 0-order light can be easily detected by the first PD 31 and the second PD 32 in the optical system shown in FIG. 1, for example.

(Casing Accommodating Optical System)

Figure 10:
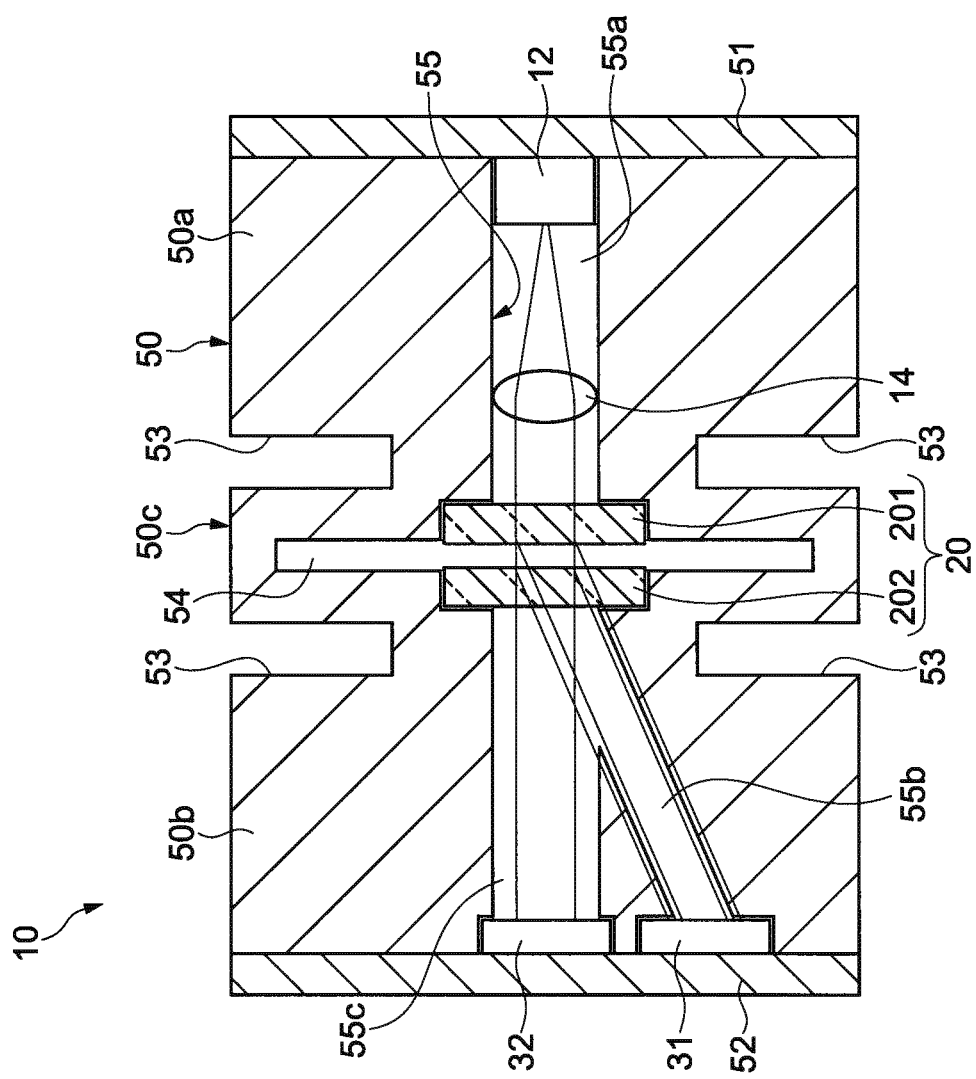
FIG. 10 is a cross-sectional diagram showing a structure of the displacement measurement apparatus, the diagram including the optical system shown in FIG. 1 and a casing accommodating the optical system.

FIG. 10 is a cross-sectional diagram showing a structure of the displacement measurement apparatus 10, the diagram including the optical system shown in FIG. 1 and a casing 50 accommodating the optical system.

The casing 50 includes a hole portion 55 in which an optical path is arranged. The hole portion 55 includes a first hole portion 55a extending from the LD 12 to the pair of diffraction gratings 20, a second hole portion 55b extending from the pair of diffraction gratings 20 to the first PD 31, and a third hole portion 55c extending from the pair of diffraction gratings 20 to the second PD 32. The first hole portion 55a and the third hole portion 55c are provided practically on the same axis, and the second hole portion 55b is provided along an axis having an angle with respect to that axis.

Hereinafter, the axis extending in the longitudinal direction of the first hole portion 55a and the third hole portion 55c is referred to as main axis for convenience. A direction of the main axis is parallel to the optical axis of the pair of diffraction gratings 20.

At both end portions of the casing 50 in the main axis direction, mounting substrates 51 and 52 are mounted. The LD 12 is mounted on the mounting substrate 51, and the first PD 31 and the second PD 32 are mounted on the mounting substrate 52.

The casing 50 includes a light source side member 50a, a sensor side member 50b, and a spring portion 50c provided between the light source side member 50a and the sensor side member 50b. The spring portion 50c includes two notches 53 on each of two opposing side surfaces of the casing 50, and a slit 54 is formed inside the casing 50. The pair of diffraction gratings 20 is held by the casing 50 while sandwiching the slit 54. Since the casing 50 is extendable in the main axis direction by the spring portion 50c, the first diffraction grating 201 and the second diffraction grating 202 are enabled to move relatively, and thus a displacement measurement becomes possible.

As a material of the casing 50, metal or a resin is used. In the case of metal, stainless steel or aluminum is used, for example. The light source side member 50a and the sensor side member 50b may be formed by a first material, and the spring portion 50c may be formed by a second material having a lower Young's modulus than the first material. In this case, the first material is metal, and the second material is a resin. It is of course possible to use different types of metal or resins for the first and second materials.

(Holder that Holds Displacement Measurement Apparatus)

Figure 11:
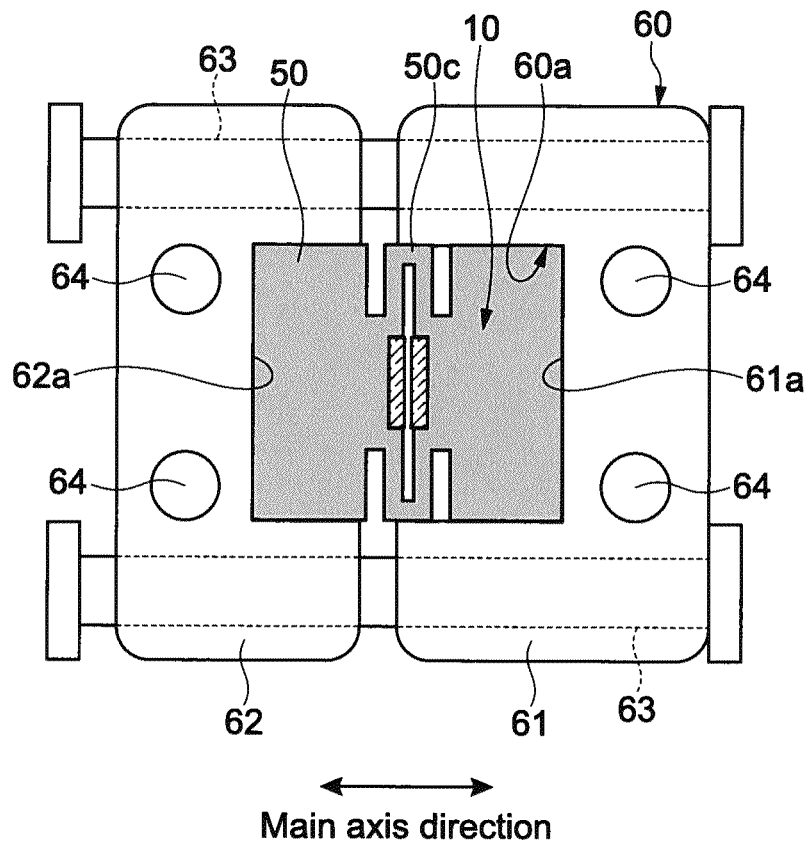
FIG. 11 is a plan view showing a holder that holds the displacement measurement apparatus.
Figure 12:
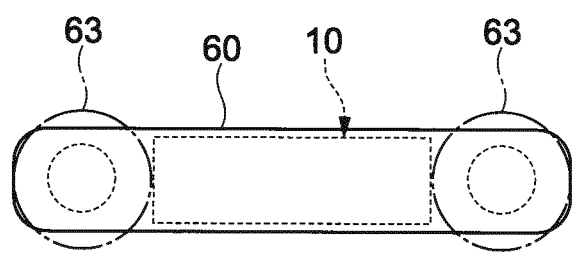
FIG. 12 is a side view of the holder in a main axis direction.

FIG. 11 is a plan view showing a holder that holds the displacement measurement apparatus. FIG. 12 is a side view of the holder in the main axis direction.

A holder 60 includes an opening 60a at substantially the center thereof, and the casing 50 of the displacement measurement apparatus 10 is fit into the opening 60a. The holder 60 includes a first member 61 and a second member 62 that are relatively slidable in the main axis direction. The first member 61 and the second member 62 respectively include concave notch portions 61a and 62a at opposing positions. The opening 60a is formed by the notch portions 61a and 62a.

The displacement measurement apparatus 10 is held by the holder 60 while side surfaces of the casing 50 of the displacement measurement apparatus 10 (including mounting substrates 51 and 52 as shown in FIG. 10) are in contact with inner surfaces of the opening 60a of the holder 60, that is, by an abutting structure. Specifically, the casing 50 is held by the holder 60 in a state where a spring force of the spring portion 50c is generated, that is, in a state where the spring portion 50c is contracted a predetermined amount in the main axis direction. In this case, the casing 50 is held by the holder 60 in a state where a clearance with which the diffraction gratings 201 and 202 do not collide is formed between the diffraction gratings 201 and 202. The state where the casing 50 is held by the holder 60 as described above is referred to as initial state of the casing 50. As will be described later, by directly or indirectly attaching the first member 61 and second member 62 of the holder 60 to a measurement target using a fixture such as a screw, the initial state of the casing 50 is maintained. The displacement X between the pair of diffraction gratings 20 in such an initial state is set to 0.

Two guide shafts 63 are passed through the first member 61 and the second member 62 in the main axis direction on both sides thereof in a direction orthogonal to the main axis direction. With this structure, the first member 61 and the second member 62 are relatively movable in the main axis direction. By providing the guide shafts 63 on both sides in the direction orthogonal to the main axis direction as described above, moves of the displacement measurement apparatus 10 in directions other than the main axis direction can be positively restricted. In other words, mainly a tilt of the pair of diffraction gratings 20 can be prevented from occurring. The tilt refers to a state where optical axes of the first diffraction grating 201 and the second diffraction grating 202 are deviated so that the diffraction gratings 201 and 202 are arranged obliquely, that is, a state where an angle is formed between the diffraction gratings 201 and 202.

Figure 13:
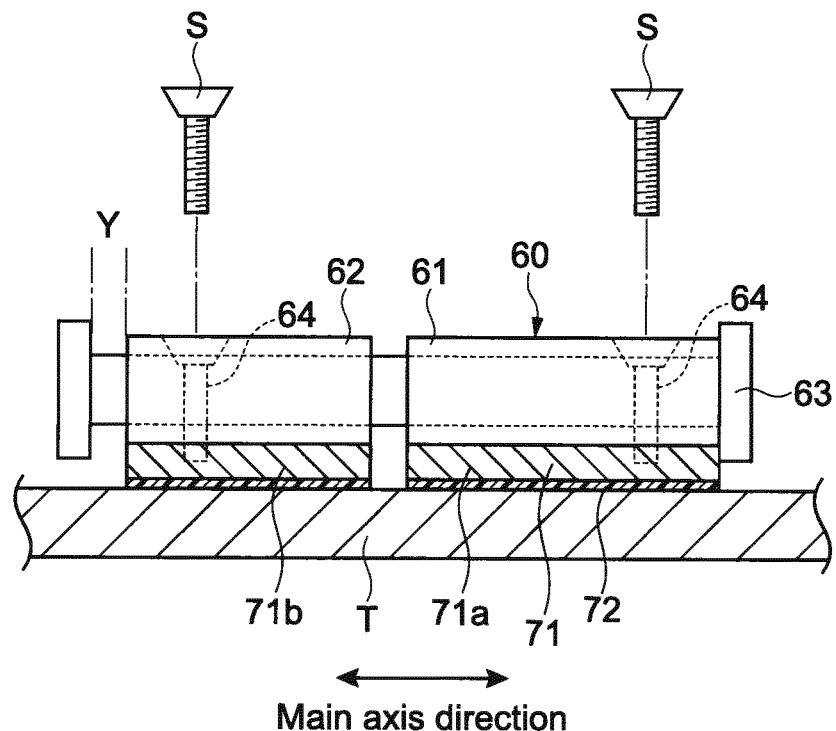
FIG. 13 is a diagram showing a state where the holder is fixed by a fixture.

FIG. 13 is a diagram showing a state where the holder 60 is fixed by a fixture such as a screw S as described above. As shown in FIGS. 11 and 13, screw holes 64 are provided in the first member 61 and second member 62 of the holder 60. Although a plurality of screw holes 64 (two each) are provided in each of the first member 61 and the second member 62, the screw holes 64 may instead be provided one each.

In the example shown in FIG. 13, a spacer 71 is fixed to a measurement target T by an adhesive 72, and the holder 60 is fixed to the spacer 71 by the screws S. In other words, the spacer 71 functions as an attachment base. Specifically, the first member 61 is attached to a first spacer 71a, and the second member 62 is attached to a second spacer 71b. With such a structure, the holder 60 holding the displacement measurement apparatus 10 can be easily attached and replaced. Moreover, the spacer 71 may also be replaceable.

Figure 14:
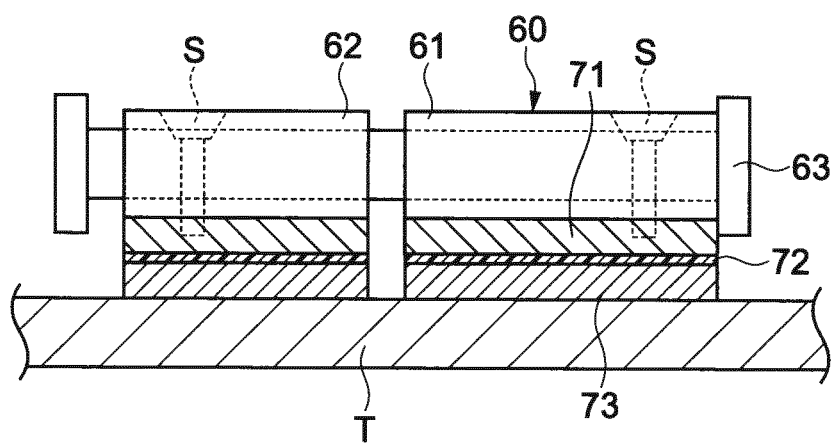
FIG. 14 is a diagram showing an example where a permanent magnet is additionally used for fixing the holder to a measurement target in FIG. 13.

Alternatively, as shown in FIG. 14, a permanent magnet 73 may be provided between the spacer 71 and the measurement target T. In this case, by attaching the spacer 71 and the permanent magnet 73 by the adhesive 72 and causing the measurement target T as a magnetic body to be adsorbed to the permanent magnet 73, the holder 60 is attached to the measurement target T.

In such a state where the holder 60 is attached to the measurement target T, the relative initial positions of the first member 61 and the second member 62 are determined and maintained, and the casing 50 held by the holder 60 maintains the initial state described above. As shown in FIG. 13, at the initial position of the holder 60, the length of the guide shafts 63 is designed to be longer only by a distance Y than that of the entire holder 60 in the main axis direction. With this structure, the first member 61 and second member 62 of the holder 60 become relatively movable when the measurement target T extends in the main axis direction and is displaced.

FIGS. 13 and 14 show examples where the holder 60 holding the displacement measurement apparatus 10 is attached to the measurement target T via the spacer 71 and the like. However, the holder 60 may be directly attached to the measurement target T using screws, an adhesive, or the like without using the spacer 71 and the like.

Figure 15A:
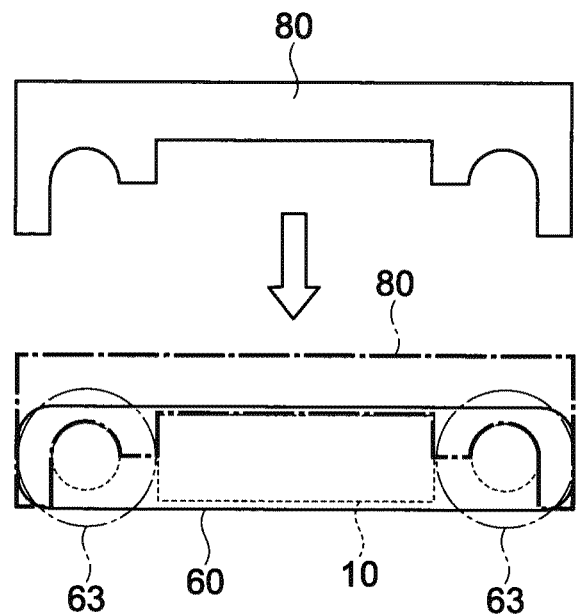
FIG. 15A is a side view of the holder in a state where a spacer is provided between first and second members of the holder in the main axis direction.
Figure 15B:
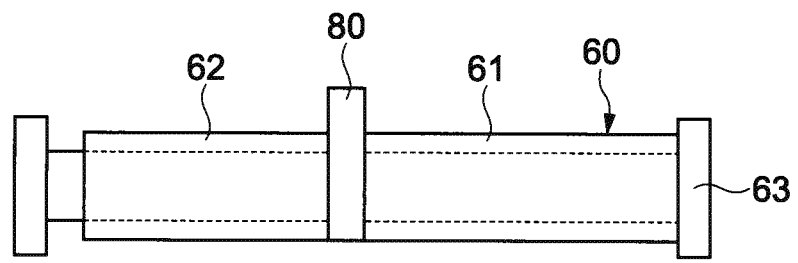
FIG. 15B is a side view of the holder in a direction orthogonal to the main axis direction.

FIG. 15A is a side view of the holder 60 in the main axis direction in a state where a spacer 80 is provided between the first member 61 and second member 62 of the holder 60 described above, and FIG. 15B is a side view of the holder 60 in a direction orthogonal to the main axis direction. By providing the spacer 80 between the first member 61 and the second member 62 as shown in the figures, the relative initial positions of the first member 61 and the second member 62 can be kept constant. Therefore, the distance between the pair of diffraction gratings 20 at the time the casing 50 is in the initial state can also be kept constant. As a result, the initial state of the displacement measurement apparatus 10 where the displacement is 0 is positively maintained.

Figure 16:
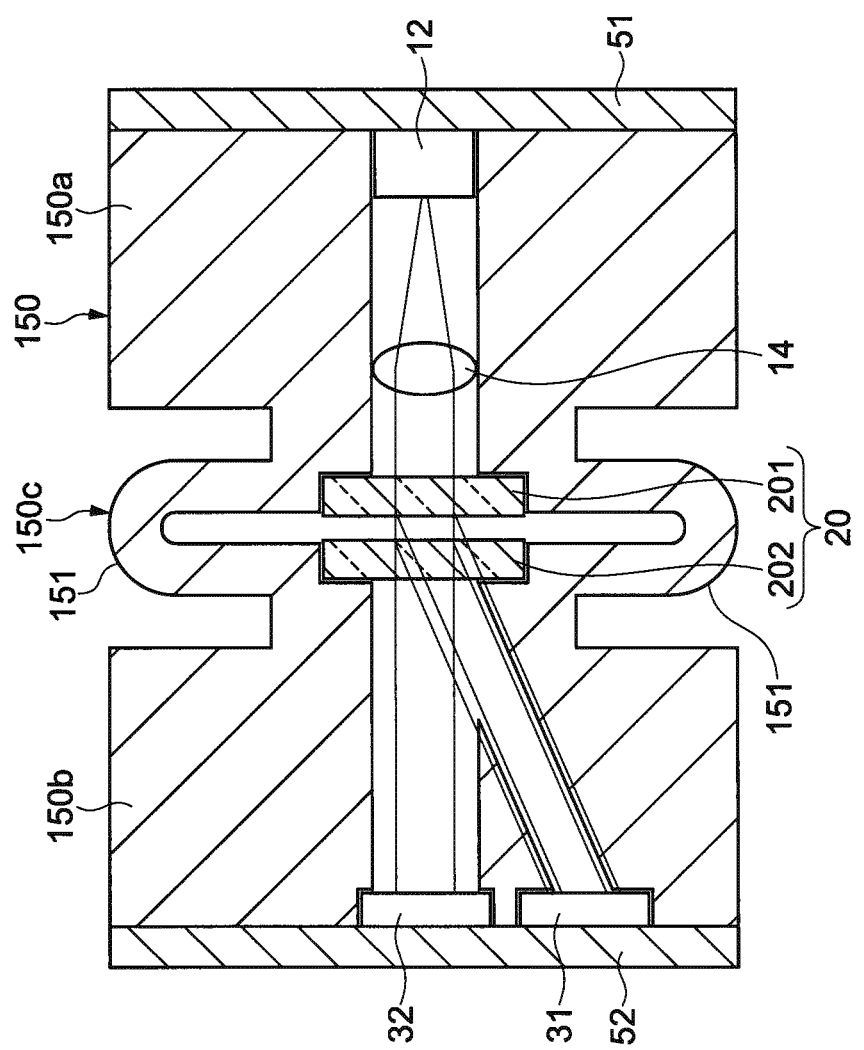
FIG. 16 is a cross-sectional diagram of a displacement measurement apparatus according to another embodiment of the present disclosure.

FIG. 16 is a cross-sectional diagram of a displacement measurement apparatus according to another embodiment of the present disclosure. A difference of the embodiment shown in FIG. 16 from that shown in FIG. 10 is a spring portion 150c of a casing 150. The spring portion 150c of this embodiment includes curved surface portions 151. Specifically, R is provided in the spring portion 150c. Accordingly, a stress caused in the spring portion 150c can be dispersed, with the result that a deterioration of the spring portion 150c can be suppressed and a lifetime of the displacement measurement apparatus can be prolonged.

As a material of a light source side member 150a, a sensor side member 150b, and the spring portion 150c in the casing 150 of this embodiment shown in FIG. 16, the various materials described above can be used for the above purposes.

Other Embodiments

The present disclosure is not limited to the embodiments described above, and various other embodiments can also be realized.

In the optical systems of the displacement measurement apparatuses of the above embodiments, the first PD 31 (33) directly receives the interference light 30 emitted from the pair of diffraction gratings 20 (25). However, the optical system may also take a structure in which interference light emitted from the pair of diffraction gratings enters the first PD 31 (33) via other optical devices such as a mirror. The same holds true for the second PD 32 (34), and light emitted from the pair of diffraction gratings 20 (25) may enter the second PD 32 (34) via other optical devices.

The second diffraction grating device 204 shown in FIG. 6 may include a non-diffraction grating area 204b shaped as a flat plate. However, the non-diffraction grating area 204b may be an opening formed at a part of the second diffraction grating device, for example, and diffracted light (non-interference light) from the first diffraction grating, that has passed the opening, may be received by the second PD. Alternatively, the first diffraction grating device arranged on the light incident side may include the non-diffraction grating area.

Alternatively, the second diffraction grating may be formed to be smaller than the first diffraction grating, and diffracted light (non-interference light) that has been emitted from the first diffraction grating and passed without passing through the second diffraction grating may be received by the second PD. Alternatively, the first diffraction grating may be formed to be smaller than the second diffraction grating.

In the embodiments above, the processing of correcting the signal of the first PD 31 (33) is carried out when a user uses the displacement measurement apparatus 10 (110). In addition, when manufacturing the displacement measurement apparatus, a manufacturer side may correct the light reception sensitivity characteristics of the first PD using the correction method described above.

The light source of the displacement measurement apparatus 10 (110) does not need to be an LD, and an LED (Light Emitting Diode) may be used instead. The LED may be of a bullet type.

It is also possible to combine at least two of the feature portions of the embodiments above. For example, the correction means (1) and (2) for the light reception sensitivity characteristics of the first PD may be combined.

What is claimed is:

1. A displacement measurement apparatus, comprising:
   a light source;
   a pair of diffraction gratings that light emitted from the light source enters, the pair of diffraction gratings opposing each other while being relatively movable along an optical axis;
   a first optical sensor that detects interference light obtained by diffracted light emitted from a diffraction grating device of each of the pair of diffraction gratings;
   a second optical sensor that detects non-interference light emitted from the pair of diffraction gratings; and
   an operation circuit that corrects a signal obtained by the first optical sensor based on a signal obtained by the second optical sensor,
   wherein the operation circuit is configured to determine whether a detection value of the signal obtained by the second optical sensor is within a redetermined range of a percentage of a change with respect to a reference value; and
   wherein the operation circuit is configured such that, if the operation circuit determines that the detection value is out of the range, it multiplies a detection value of the signal obtained by the first optical sensor by a coefficient corresponding to the percentage of a change, and outputs the obtained value.

2. The displacement measurement apparatus according to claim 1,
   wherein the second optical sensor detects 0-order light that passes through the pair of diffraction gratings.

3. The displacement measurement apparatus according to claim 1,
   wherein the diffraction grating device, of one of the pair of diffraction gratings, includes a diffraction grating area and a non-diffraction grating area, and
   wherein the second optical sensor detects light that passes through the non-diffraction grating area as the non-interference light.

4. The displacement measurement apparatus according to claim 1,
   wherein the operation circuit performs the correction based on an expression that expresses a relationship between an intensity of the interference light obtained by the first optical sensor and an intensity of the non-interference light obtained by the second optical sensor.

5. A displacement measurement method, comprising:
   emitting light from a light source;
   detecting, by a first optical sensor, interference light obtained by diffracted light emitted from a diffraction grating device of each of a pair of diffraction gratings provided opposed to each other while being relatively movable along an optical axis;
   detecting, by a second optical sensor, non-interference light out of the light emitted from the light source; and
   correcting, by an operation circuit, a signal obtained by the first optical sensor based on a signal obtained by the second optical sensor;
   wherein the correcting step includes:
      determining, by the operation circuit, whether a detection value of the signal obtained by the second optical sensor is within a predetermined range of a percentage of a change with respect to a reference value; and
      if the operation circuit determines that the detection value is out of the range, multiplying a detection value of the signal obtained by the first optical sensor by a coefficient corresponding to the percentage of a change, and outputting the obtained value.

\* \* \* \* \*